(12) United States Patent
Park et al.

(10) Patent No.: US 11,485,351 B2
(45) Date of Patent: Nov. 1, 2022

(54) APPARATUS OF CONTROLLING HYBRID VEHICLE AND METHOD THEREOF

(71) Applicants: HYUNDAI MOTOR COMPANY, Seoul (KR); KIA MOTORS CORPORATION, Seoul (KR)

(72) Inventors: Jihyun Park, Hwaseong-si (KR); Dong Hee Han, Seongnam-si (KR); Hyun Woo Lim, Hwaseong-si (KR); Buhm Joo Suh, Hwaseong-si (KR); Jinkuk Cho, Hwaseong-si (KR); Kwanhee Lee, Suwon-si (KR); Sungchan Na, Seongnam-si (KR); Yeongseop Park, Seoul (KR); Seungwoo Hong, Seoul (KR); Yong Kak Choi, Seoul (KR); Hyunjin Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 172 days.

(21) Appl. No.: 17/101,854

(22) Filed: Nov. 23, 2020

(65) Prior Publication Data
US 2021/0179069 A1 Jun. 17, 2021

(30) Foreign Application Priority Data

Dec. 13, 2019 (KR) ........................ 10-2019-0166589

(51) Int. Cl.
*B60W 10/08* (2006.01)
*B60W 20/15* (2016.01)
(Continued)

(52) U.S. Cl.
CPC ............ *B60W 20/15* (2016.01); *B60W 10/06* (2013.01); *B60W 10/08* (2013.01); *B60W 10/30* (2013.01);
(Continued)

(58) Field of Classification Search
CPC ...... B60W 10/08; B60W 10/06; B60W 10/30; B60W 20/13; B60W 20/15; B60W 2510/244; F02B 37/001; F02B 39/10
See application file for complete search history.

(56) References Cited

U.S. PATENT DOCUMENTS

| 7,797,062 B2 * | 9/2010 | Discenzo | ................ H04L 67/12 700/20 |
| 8,046,125 B2 * | 10/2011 | Kim | .................. B60W 30/1882 320/132 |

(Continued)

FOREIGN PATENT DOCUMENTS

| KR | 10-0589169 B1 | 6/2006 |
| KR | 10-0747796 B1 | 8/2007 |

(Continued)

*Primary Examiner* — Gonzalo Laguarda
(74) *Attorney, Agent, or Firm* — Lempia Summerfield Katz LLC (57) ABSTRACT

An apparatus of controlling a hybrid vehicle may include: an engine; a drive motor to assist the power of the engine and selectively operate as a generator to generate electrical energy; a battery to supply electrical energy; a first intake valve disposed in a first intake line; a second intake valve disposed in a second intake line; a first electric supercharger disposed in the first intake line; a second electric supercharger disposed in the second intake line; a connecting valve disposed in a connecting line for connecting the first intake line and the second intake line; and a controller that determines a driving mode of the first and second electric superchargers. In particular, the controller controls the drive motor and the first and second electric superchargers based on a supercharger consumed energy, an additional fuel energy, and a drive motor consumed energy.

12 Claims, 9 Drawing Sheets

(51) Int. Cl.
  B60W 10/06 (2006.01)
  B60W 20/13 (2016.01)
  F02B 39/10 (2006.01)
  F02B 37/00 (2006.01)
  B60W 10/30 (2006.01)

(52) U.S. Cl.
  CPC ........... B60W 20/13 (2016.01); F02B 37/001 (2013.01); F02B 39/10 (2013.01); *B60W 2510/244* (2013.01)

(56) References Cited

U.S. PATENT DOCUMENTS

| | | | |
|---|---|---|---|
| 9,729,639 B2* | 8/2017 | Sustaeta | H04L 67/125 |
| 11,007,998 B1* | 5/2021 | Suh | F02B 39/10 |
| 2007/0112496 A1 | 5/2007 | Ji | |
| 2021/0046919 A1* | 2/2021 | Choi | B60L 15/2045 |
| 2021/0179067 A1* | 6/2021 | Choi | B60W 10/08 |

FOREIGN PATENT DOCUMENTS

| | | |
|---|---|---|
| KR | 10-0792893 B1 | 1/2008 |
| KR | 10-0992755 B1 | 11/2010 |
| KR | 10-2012-0000952 A | 1/2012 |
| KR | 10-2012-0060112 A | 6/2012 |
| KR | 10-1181032 B1 | 9/2012 |
| KR | 10-1209731 B1 | 12/2012 |
| KR | 10-1251502 B1 | 4/2013 |
| KR | 10-2013-0068411 A | 6/2013 |
| KR | 10-1510048 B1 | 4/2015 |
| KR | 10-1542988 B1 | 8/2015 |
| KR | 10-1558815 B1 | 10/2015 |
| KR | 10-1601473 B1 | 3/2016 |
| KR | 10-1655609 B1 | 9/2016 |
| KR | 10-1684507 B1 | 12/2016 |
| KR | 10-1703577 B1 | 2/2017 |
| KR | 10-1703613 B1 | 2/2017 |
| KR | 10-1704266 B1 | 2/2017 |
| KR | 10-1765635 B1 | 8/2017 |
| KR | 10-1776529 B1 | 9/2017 |
| KR | 10-2018-0067300 A | 6/2018 |
| KR | 10-1901801 B1 | 9/2018 |
| KR | 10-2018-0116648 A | 10/2018 |

* cited by examiner

APPARATUS OF CONTROLLING HYBRID VEHICLE AND METHOD THEREOF

CROSS-REFERENCE TO RELATED APPLICATION

This application claims priority to and the benefit of Korean Patent Application No. 10-2019-0166589, filed on Dec. 13, 2019, the entire contents of which are incorporated herein by reference.

FIELD

The present disclosure relates to an apparatus of controlling a hybrid vehicle and a method thereof. More particularly, the present disclosure relates to a hybrid vehicle provided with an engine having two electric superchargers and a drive motor and a method thereof.

BACKGROUND

The statements in this section merely provide background information related to the present disclosure and may not constitute prior art.

A hybrid vehicle is a vehicle using two or more power sources and generally refers to a hybrid electric vehicle driven using an engine and a motor. A hybrid electric vehicle may form various structures using two or more power sources including an engine and a motor.

In general, a hybrid electric vehicle uses a power train in a manner of a transmission mounted electronic device (TMED) in which a drive motor, a transmission, and drive shaft are connected in series to each other.

In addition, a clutch is disposed between an engine and a motor, and the hybrid electric vehicle is driven in an electric vehicle (EV) mode or in a hybrid electric vehicle (HEV) mode, depending on whether the clutch is engaged. The EV mode is a mode in which a vehicle is driven by only driving torque of a drive motor, and the HEV mode is a mode in which the vehicle is driven by driving torque of the drive motor and the engine.

In the conventional hybrid vehicle, it uses a control strategy that calculates a required torque of a driver based on a position of an accelerator pedal and distributes an engine torque and a drive motor torque in consideration of a SOC (state of charge) of a battery and a load of electric components.

Recently, an engine provide with a plurality of electric superchargers has been developed to increase the amount of supercharged air supplied to the engine. We have discovered that if the conventional control strategy is used as it is, there are difficulties in determining operating points of the engine and the drive motor, and thus a new control strategy of controlling the hybrid vehicle equipped with an engine and a drive motor including an electric supercharger is desired.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus of controlling a hybrid vehicle provided with an engine including two electric superchargers and a drive motor and a method thereof.

In one form of the present disclosure, an apparatus of controlling a hybrid vehicle may include: an engine configured to combust fuel to generate power; a drive motor configured to assist the power of the engine and to selectively operate as a generator to generate electrical energy; a battery configured to supply electrical energy to the drive motor or to be charged by the electrical energy generated at the drive motor; a first intake valve disposed in a first intake line in which intake air supplied to the combustion chamber flows; a second intake valve disposed in a second intake line in which intake air supplied to the combustion chamber flows; a first electric supercharger disposed in the first intake line; a second electric supercharger disposed in the second intake line; a connecting valve disposed in a connecting line for connecting the first intake line and the second intake line; and a controller configured to determine a driving mode among a plurality of driving modes of the first and second electric supercharger, and control the drive motor and the first and second electric superchargers by comparing a summation of a supercharger consumed energy and an additional fuel energy to a drive motor consumed energy. In particular, the supercharger consumed energy is an energy that is consumed by the first and second electric superchargers in the driving mode, the additional fuel energy is an energy generated by fuel additionally supplied to the engine comparing to an energy consumed when the engine is operated at an optimal operating line (OOL) in a natural aspiration (NA) mode, and the drive motor consumed energy is an energy consumed by the drive motor when the engine output is assisted by the drive motor.

The plurality of driving modes of the first and second electric superchargers may include: a single mode, a serial mode, and a parallel mode. In the single mode, intake air compressed by one of the first and second electric superchargers is supplied to the combustion chamber, and in the serial mode, intake air doubly compressed by the first electric supercharger and the second electric supercharger is supplied to the combustion chamber. In the parallel mode, intake air compressed by the first electric supercharger and intake air compressed by the second electric supercharger are supplied in parallel to the combustion chamber.

The controller may determine an operation of the drive motor or the first and second electric superchargers based on a state of charger (SOC) of the battery when the summation of the supercharger consumed energy and the additional fuel energy is greater than the drive motor consumed energy.

The controller may operate the drive motor to assist the engine output when the SOC of the battery is in a high region or a normal region.

The controller may operate the first and second electric superchargers to increase the engine output when the SOC of the battery is in a low region.

The controller may operate the first and second electric superchargers according to the determined driving mode such that the engine output is increase when the summation of the supercharger consumed energy and the additional fuel energy is less than the drive motor consumed energy.

In another form of the present disclosure, a method of controlling a hybrid vehicle may include: determining, by a controller, a driving mode among a plurality of driving modes of a first electric supercharger and a second electric supercharger based on a required torque from a driver; calculating, by the controller, a supercharger consumed energy and an additional fuel energy, wherein the supercharger consumed energy is an energy that is consumed by the first and second electric superchargers in the driving mode, and the additional fuel energy is an energy generated by fuel additionally supplied to the engine comparing to an energy consumed when the engine is operated at an optimal operating line (OOL) in a natural aspiration (NA) mode; calculating, by the controller, a drive motor consumed energy, wherein the drive motor consumed energy is an energy consumed by the drive motor when the engine output increased by the operation of the first and second electric superchargers is assisted by the drive motor without operating the electric superchargers; and controlling, by the controller, an operation of the drive motor and the first and second electric superchargers by comparing a summation of the supercharger consumed energy and the additional fuel energy to the drive motor consumed energy.

The plurality of driving modes of the first and second electric superchargers may include a single mode, a serial mode, and a parallel mode. In particular, the single mode is a mode that intake air compressed by one of the two electric superchargers is supplied to the combustion chamber, the serial mode is a mode that intake air is doubly compressed by the first electric supercharger and the second electric supercharger and supplied to the combustion chamber, and the parallel mode is a mode that intake air compressed by the first electric supercharger and intake air compressed by the second electric supercharger, respectively, are supplied to the combustion chamber.

An operation of the drive motor or the first and second electric superchargers may be determined based on a state of charger (SOC) of a battery when the summation of the supercharger consumed energy and the additional fuel energy is greater than the drive motor consumed energy.

The drive motor may be operated to assist the engine output when the SOC of the battery is in a high region or a normal region.

The electric superchargers may be operated to increase the engine output when the SOC of the battery is in a low region.

The electric superchargers may be operated according to the determined driving mode such that the engine output is increase when the summation of the supercharger consumed energy and the additional fuel energy is less than the drive motor consumed energy.

According to an exemplary form of the present disclosure, since an operation of the drive motor and the electric superchargers to meet the required torque of the driver is determined by comparing the supercharger consumed energy to the drive motor consumed energy, it is possible to minimize power consumption of the engine and the drive motor.

Further, an operation of the drive motor and the electric superchargers is controlled by considering SOC of a battery, thereby improving the system efficiency of the entire vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

Also, the size and thickness of each element are arbitrarily shown in the drawings, but the present disclosure is not necessarily limited thereto, and in the drawings, the thickness of layers, films, panels, regions, etc., are exaggerated for clarity.

Hereinafter, an apparatus of controlling a hybrid vehicle according to an exemplary form of the present disclosure is described in detail reference to the drawings.

Figure 1:
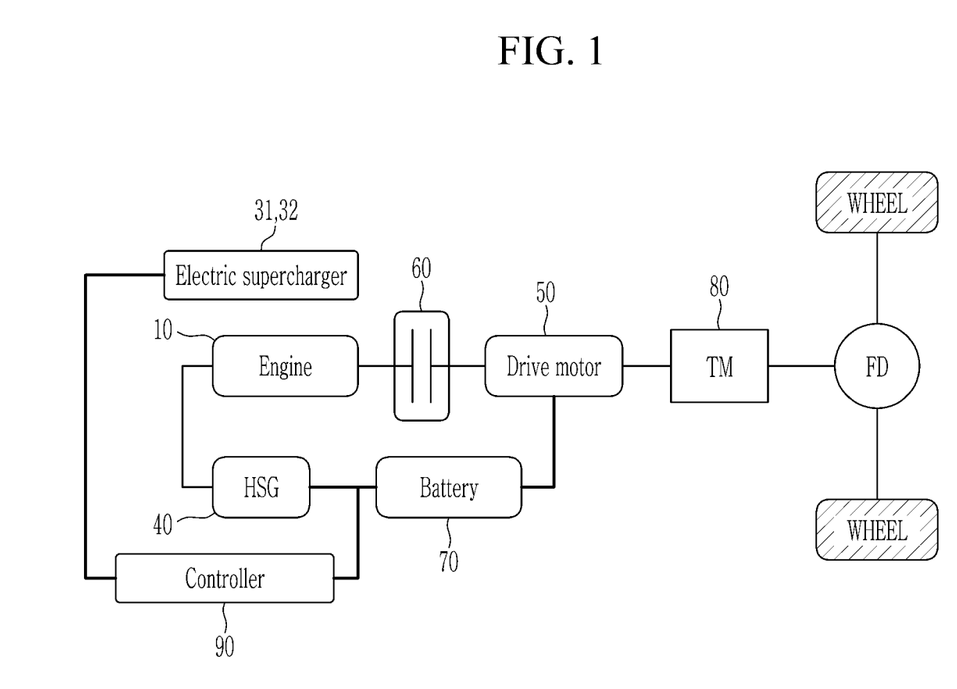
FIG. 1 is a schematic diagram of an apparatus of controlling a hybrid vehicle according to an exemplary form.
Figure 2:
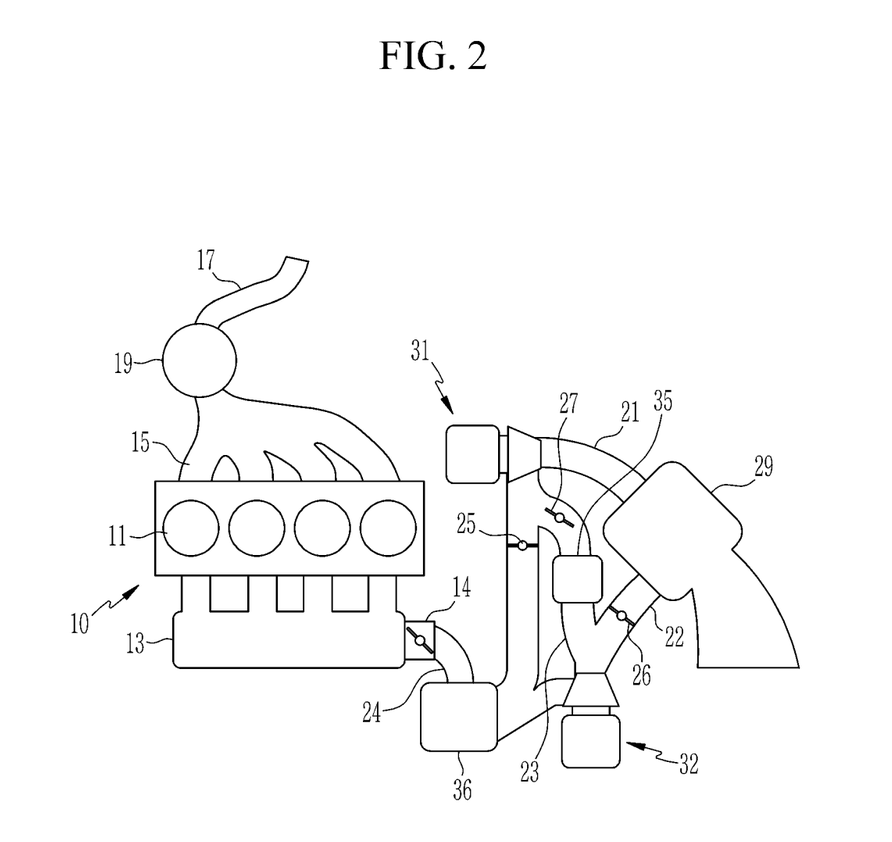
FIG. 2 is schematic diagram illustrating a relationship between a hybrid vehicle and an electric supercharger according to an exemplary form.

FIG. 1 is a schematic diagram of an apparatus of controlling a hybrid vehicle according to an exemplary form. FIG. 2 is schematic diagram illustrating a hybrid vehicle having an electric supercharger according to an exemplary form. In addition, FIG. 3 is a block diagram illustrating an apparatus of controlling a hybrid vehicle according to an exemplary form.

Hereinafter, a hybrid vehicle according to an exemplary form takes an example of a transmission mounted electric device (TMED) structure. However, the scope of the present disclosure is not limited thereto, and may be applied to another type of hybrid electric vehicle.

Figure 3:
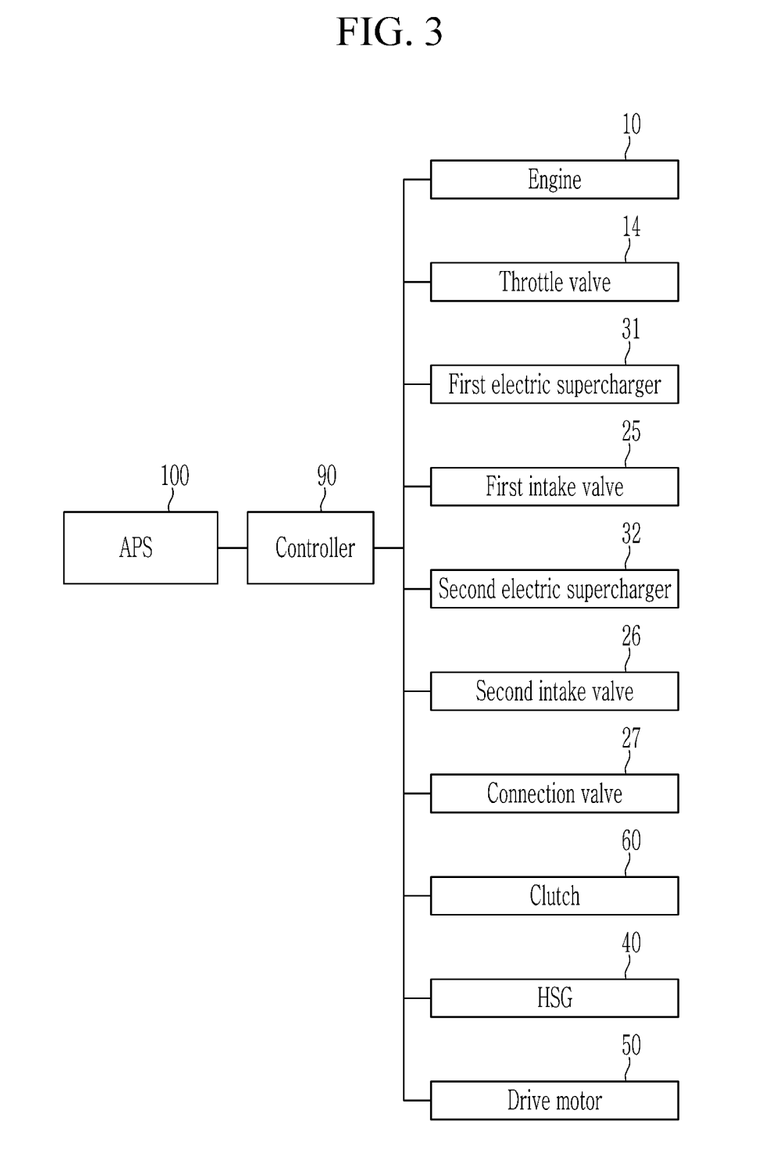
FIG. 3 is a block diagram illustrating an apparatus of controlling a hybrid vehicle according to an exemplary form.

As shown in FIG. 1 to FIG. 3, the hybrid vehicle may include an engine 10, an HSG 40, a drive motor 50, a clutch 60, a battery 70, an accelerator pedal position sensor 100, and a controller 90.

The engine 10 generates power by combusting fuel.

Referring to FIG. 2, an intake air supplied to combustion chambers 11 of the engine 10 is supplied through a plurality of intake lines, and an exhaust gas exhausted from the combustion chambers 11 of the engine 10 is discharged through an exhaust manifold 15 and an exhaust line 17. At this time, a catalytic converter 19 for purifying exhaust gas is installed in the exhaust line 17.

The plurality of intake lines may include a first intake line 21 through which an ambient air supplied to the combustion chamber 11 flows and a second intake line 22 through which an ambient air supplied to the combustion chamber 11. However, the scope of the present disclosure is not limited thereto.

A connection line 23 connecting the first intake line 21 and the second intake line 22 is installed between the first intake line 21 and the second intake line 22. That is, the connection line 23 branches from the first intake line 21 and joins the second intake line 22.

Each electric supercharger installed in the first intake line 21 and the second intake line 22 are for supplying charged air to the combustion chamber 11, and includes a motor and an electric compressor. The electric compressor is operated by the motor, compresses the ambient air according to driving conditions, and supplies the compressed air to the combustion chamber 11.

A first intake valve 25 is installed in the first intake line 21. In more detail, the first intake valve 25 may be installed in a downstream side of a first electric supercharger 31 installed in the first intake line 21. An intake amount of air supplied through the first intake line 21 is adjusted by an opening the first intake valve 25.

A second intake valve 26 is installed in the second intake line 22. In more detail, the second intake valve 26 may be installed in an upstream side of a second electric supercharger 32 installed in the second intake line 22. An intake amount of air supplied through the second intake line 22 is adjusted by an opening of the second intake valve 26.

The first intake line 21 and the second intake line 22 join at a main intake line 24, and a main intercooler 36 may be installed in the main intake line 24. The air compressed by the electric superchargers 31, 32 is cooled by the main intercooler 36.

A bypass valve 27 is installed on the connection line 23. In one form, an auxiliary intercooler 35 may be installed in the connection line 23. The air compressed by the first electric supercharger 31 is cooled by the auxiliary intercooler 35.

An air cleaner 29 for filtering an ambient air flowing in from an outside is mounted at an inlet of the first intake line 21 and the second intake line 22.

An intake air flowing in through the first intake line 21 and the second intake line 22 is supplied to the combustion chamber 11 through the intake manifold 13. The intake manifold 13 is equipped with a throttle valve 14 to adjust an air amount supplied to the combustion chamber 11.

In an exemplary form, the two electric superchargers 31, 32 may operate in three driving modes. The three driving modes may include a single mode, a serial mode, and a parallel mode.

Figure 5:
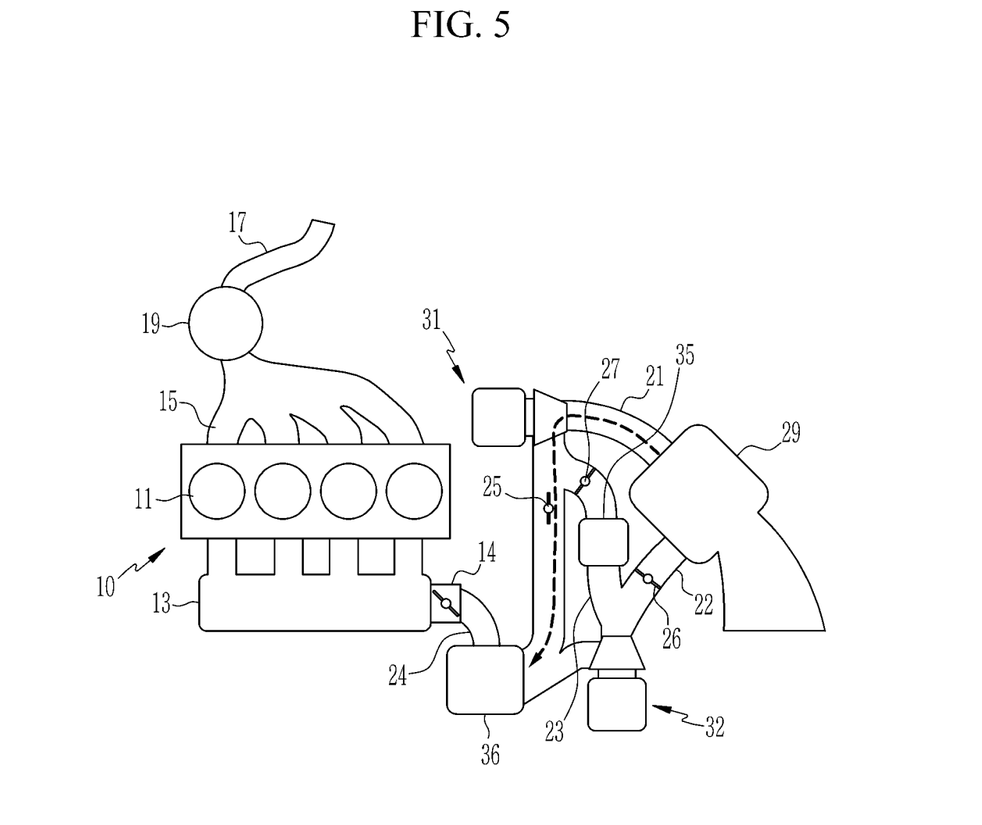
FIG. 5 is a schematic view illustrating an operation of electric superchargers applied to a hybrid vehicle in a single mode.

Referring to FIG. 5, the single mode is a mode in which only one electric supercharger operates to supply a charged air to the combustion chamber 11 of the engine 10. In the single mode, only one electric supercharger (e.g., the first electric supercharger 31) of the two electric superchargers is operated, and the other electric supercharger (e.g., the second electric supercharger 32) is not operated. At this time, the second intake valve 26 and the bypass valve 27 are closed, and the charged air amount supplied to the combustion chamber 11 may be determined by an opening of the first intake valve 25 and the rotation speed of the first electric supercharger 31. The electric supercharger may be operated in the single mode in low load region.

Figure 6:
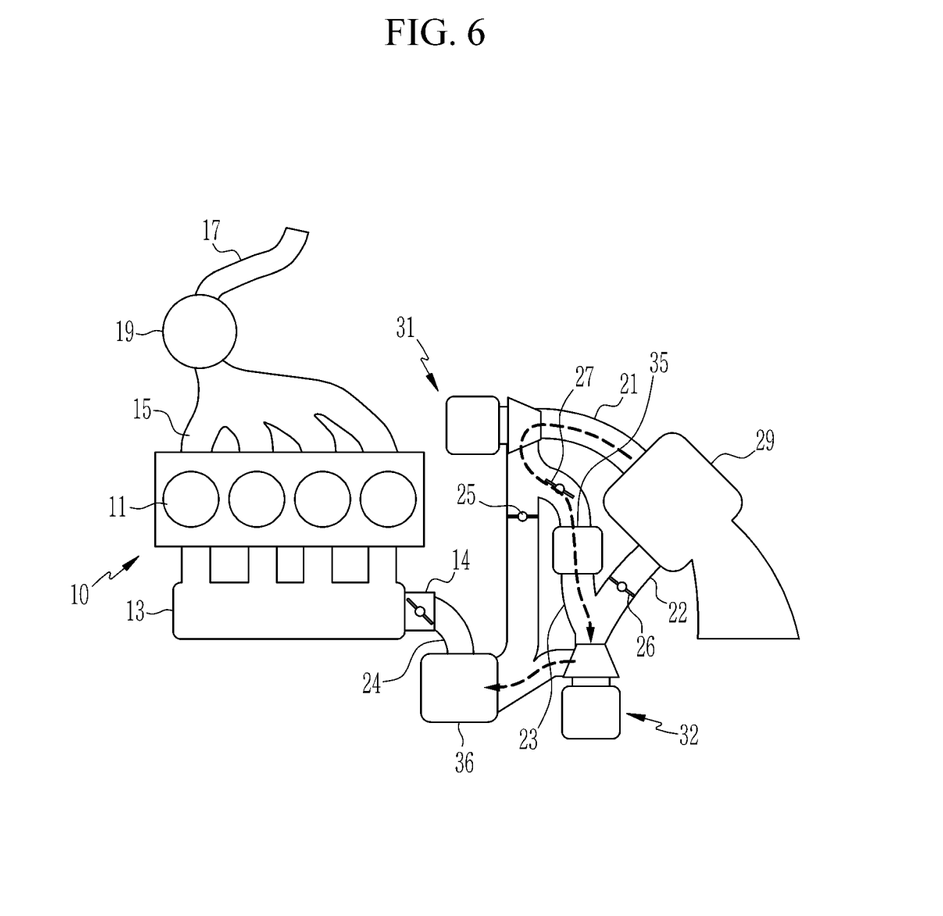
FIG. 6 is a schematic view illustrating an operation of electric superchargers applied to a hybrid vehicle in a serial mode.

Referring to FIG. 6, the serial mode is a mode that supplies doubly charged air by two electric superchargers to the combustion chamber 11 of the engine 10. At this time, the first intake valve 25 and the second intake valve 26 are both closed, and the charged air amount supplied to the combustion chamber 11 is adjusted by adjusting an opening of the bypass valve 27. In addition, the controller 90 operates the first electric supercharger 31 and the second electric supercharger 32, and supplies the air charged by the first electric supercharger 31 and the second electric supercharger 32 to the combustion chamber 11.

That is, the ambient air that flowed into the first intake line is primarily boosted by the first electric supercharger 31, and then flowed into the second intake line 22 through the connection line 23. In addition, the air is additionally boosted by the second electric supercharger 32.

The electric supercharger may be operated in the serial mode in a low-medium speed high-load region. Since a high compression ratio is required in the low-medium speed high-load region, the compression ratio of ambient air supplied to the combustion chamber 11 may be increased by driving the first electric supercharger 31 and the second electric supercharger 32 in series.

Figure 7:
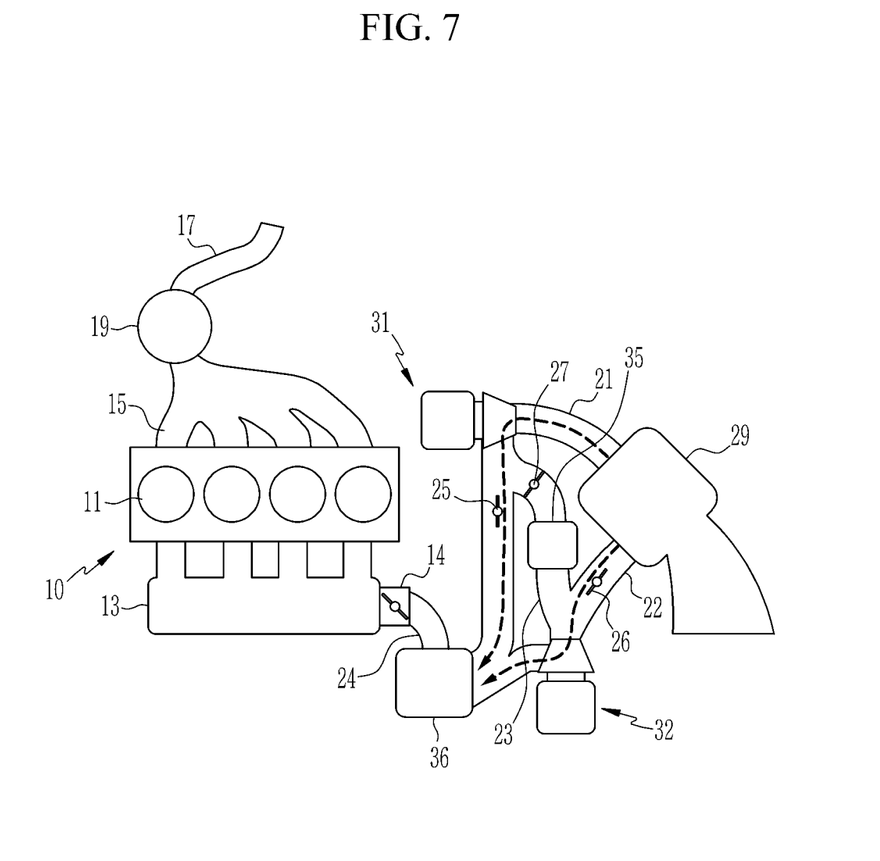
FIG. 7 is a schematic view illustrating an operation of electric superchargers applied to a hybrid vehicle in a parallel mode.

Referring to FIG. 7, the parallel mode is a mode that supplies air charged by each of two electric superchargers to the combustion chamber 11 of the engine 10. At this time, the controller 90 controls the connection valve 27 to be closed, and controls the opening of the first intake valve 25 and the second intake valve 26 to control the amount of charged air supplied to the combustion chamber 11. In addition, the controller 90 operates the first electric supercharger 31 and the second electric supercharger 32, and supplies air charged by the first electric supercharger 31 and the second electric supercharger 32 to the combustion chamber 11, respectively.

The electric superchargers may be operated in the parallel mode in a high-speed high-load region. Since the high-speed high-load region require a large amount of ambient air, intake air is supplied to the combustion chamber 11 through the first intake line 21 and the second intake line 22. That is, by driving the first electric supercharger 31 and the second electric supercharger 32 in parallel, a large amount of intake air may be supplied to the combustion chamber 11.

Referring back to FIG. 1, the HSG 40 starts the engine 10 and selectively operates as a generator to generate electrical energy when the engine 10 is started.

The drive motor 50 assists the power of the engine 10 and selectively operates as a generator to generate electrical energy.

The drive motor 50 is operated by using an electrical energy charged in the battery 70, and the electrical energy generated by the drive motor 50 and the HSG 40 is charged in the battery 70.

Figure 4:
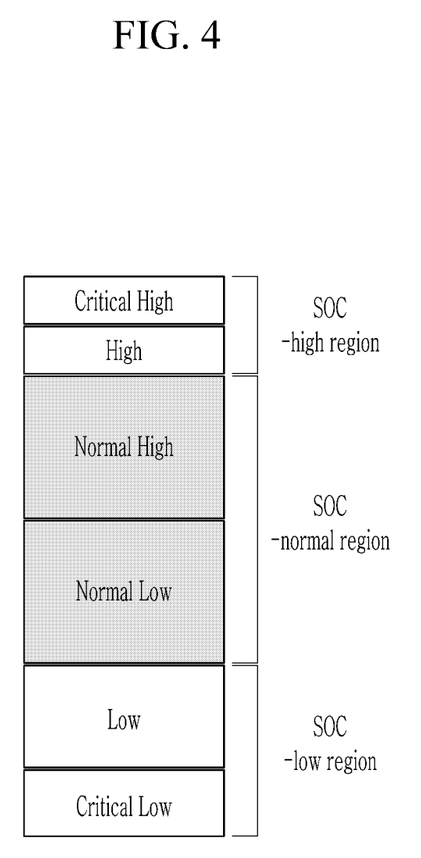
FIG. 4 is a schematic diagram illustrating SOC regions of a battery according to an exemplary form.

In the hybrid vehicle according to an exemplary form of the present disclosure, an operation of the engine and the drive motor of may be controlled according to the SOC (state of charge) of the battery 70. In an exemplary form, the SOC of the battery 70 may be divided into three regions. Referring to FIG. 4, the SOC regions of the battery 70 may be divided into a high region, a normal region, and a low region. In addition, the high region may be divided into critical high (CH) and high (H) regions, the normal region may be divided into normal high (NH) and normal low (NL) regions, and the low region may be divided into low (L) and critical low (CL) regions.

The accelerator pedal position sensor 100 detects an operation of the accelerator pedal. The accelerator pedal position detected by the accelerator pedal position sensor 100 is transmitted to the controller 90. The controller 90 may determine a requested power according to the driver's acceleration intention from the accelerator pedal position detected from the accelerator pedal position sensor, and the driving mode may be selectively switched from EV mode to HEV mode.

The controller 90 controls the vehicle's constituent elements including the engine 10, the HSG 40, the drive motor 50, the electric superchargers 31 and 32, the battery 70, and the clutch 60.

The controller 90 may be provided as at least one processor operable by a predetermined program, where the predetermined program may include instructions to respective steps of a method of controlling an engine including an electric supercharger based on a driver's tendency according to an exemplary form.

The controller 90 according to an exemplary form of the present disclosure may mean each of an engine control unit (ECU) that controls the engine and a hybrid control unit (HCU), or may refer to an integrated controller in which the ECU and the HCU are integrated.

The clutch 60 is provided between the engine 10 and the drive motor 50, and depending on whether the clutch 60 is engaged, the hybrid vehicle is operated in the electric vehicle (EV) mode or in the hybrid electric vehicle (HEV) mode. The EV mode is a mode in which the vehicle is driven only by the driving torque of the motor, and the HEV mode is a mode in which the vehicle is driven by the driving torque of the motor and the engine 10.

The driving power output from the engine 10 and the drive motor 50 is transmitted to a drive wheel provided in the vehicle. At this time, a transmission 80 is provided between the clutch 60 and the drive wheel. A shifting gear is installed within the transmission 80, and the torque output from the engine 10 and the drive motor 50 is shifted according to a shift-stage.

Hereinafter, a method of controlling the hybrid vehicle according to an exemplary form of the present disclosure is described in detail reference to the drawings.

Figure 8:
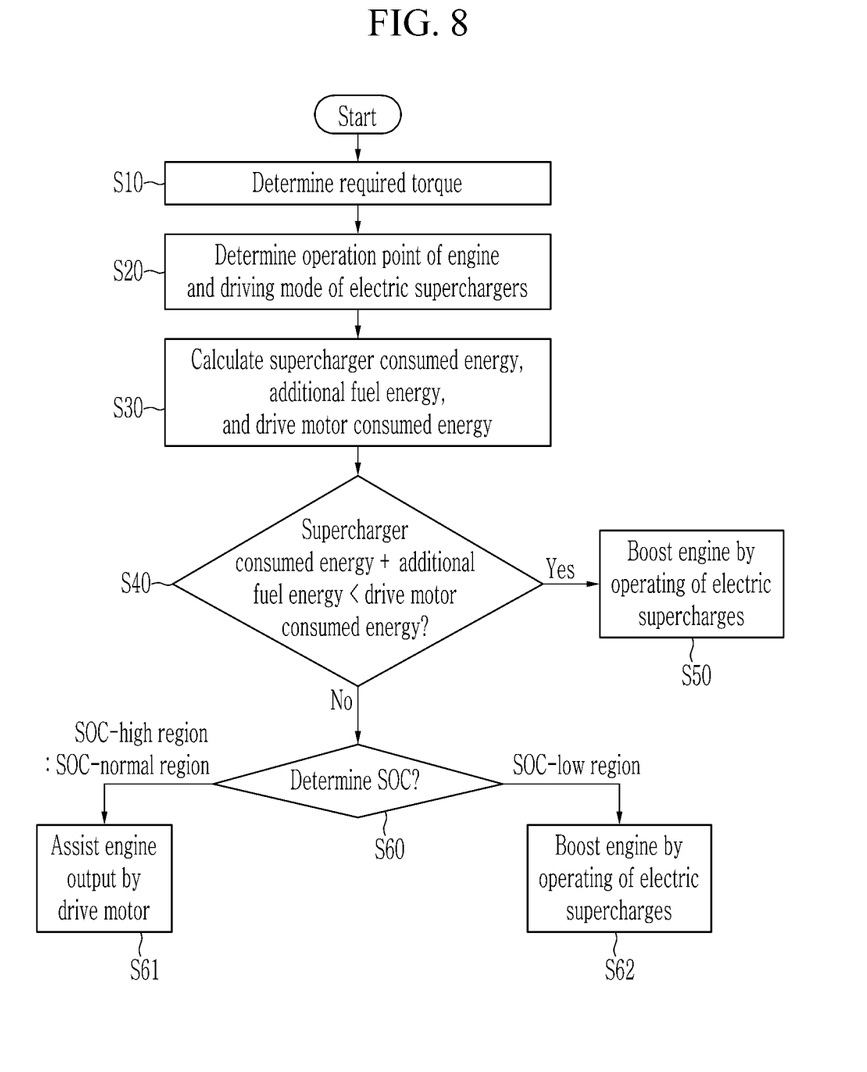
FIG. 8 is a flowchart illustrating a method of controlling a hybrid vehicle according to an exemplary form of the present disclosure.

FIG. 8 is a flowchart illustrating a method of controlling a hybrid vehicle according to an exemplary form of the present disclosure.

As shown in FIG. 8, the controller 90 may determine a required torque of a driver based on a current vehicle speed, a position of the accelerator pedal, and a load of the vehicle at step S10.

The controller 90 may determine an operation point of the engine 10 and a driving mode of the two electric superchargers for satisfying the required torque of the driver at step S20.

As described above, the driving mode of the electric superchargers may include the single mode, the serial mode, and the parallel mode. The single mode is a mode that intake air compressed by one of the two electric superchargers is supplied to the combustion chamber, the serial mode is a mode that intake air is doubly compressed by the first electric supercharger and the second electric supercharger and supplied to the combustion chamber, and the parallel mode is a mode that intake air compressed by the first electric supercharger and intake air compressed by the second electric supercharger, respectively, are supplied to the combustion chamber. In addition, the driving mode may further include a NA mode (natural aspiration mode) that all electric superchargers do not operate and the engine 10 is operated by only natural intake air.

Figure 9:
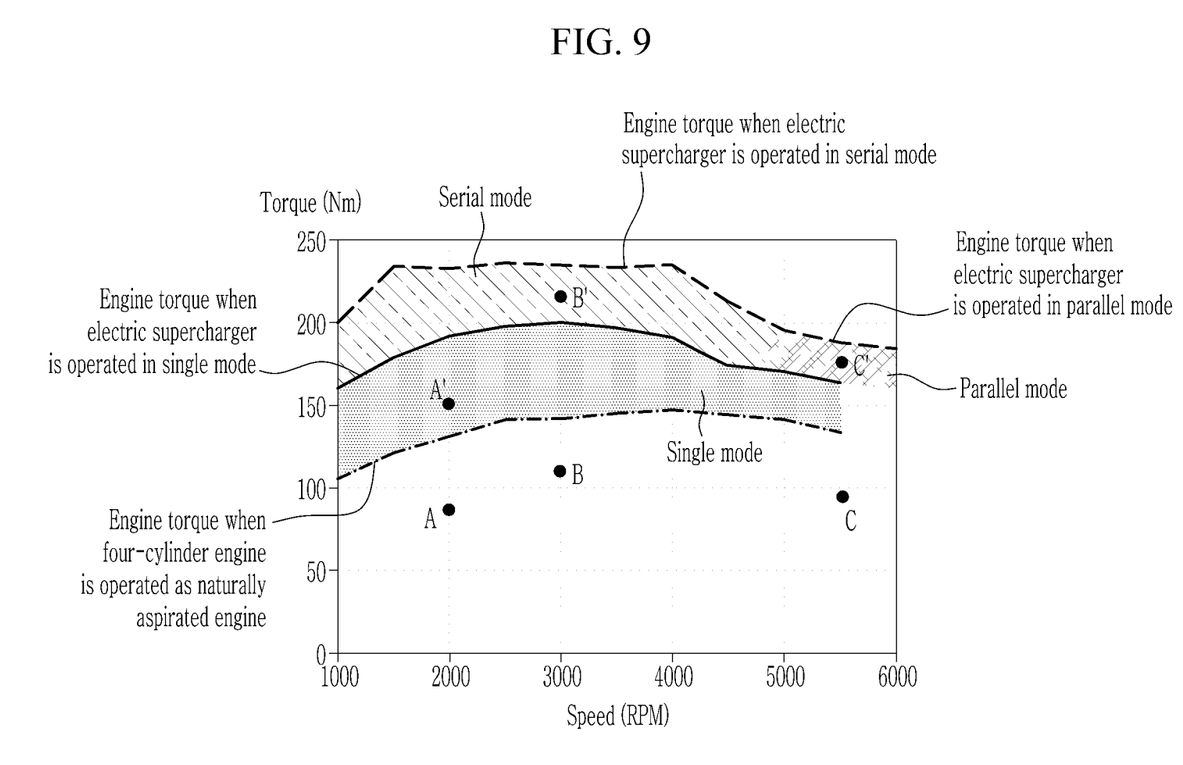
FIG. 9 is a graph illustrating operating point of a hybrid vehicle according to an exemplary form of the present disclosure.

For example, referring to FIG. 9, the controller 90 may control the electric superchargers to be operated in the single mode when the operating point of the engine 10 for satisfying the required torque of the driver is positioned in a middle load region.

When the operating point of the engine 10 for satisfying the required torque of the driver is positioned in a low-medium speed high-load region, the controller 90 may control the electric superchargers to be operated in the serial mode. Since a high compression ratio is required in the low-medium speed high-load region, the compression ratio of ambient air supplied to the combustion chamber 11 may be increased by driving the first electric supercharger 31 and the second electric supercharger 32 in series.

And when the operating point of the engine 10 for satisfying the required torque of the driver is positioned in a high-speed high-load region, the controller 90 may control the electric superchargers to be operated in the parallel mode. Since the high-speed high-load region requires a large amount of ambient air, intake air is supplied to the combustion chamber 11 through the first intake line 21 and the second intake line 22. That is, by driving the first electric supercharger 31 and the second electric supercharger 32 in parallel, a large amount of intake air may be supplied to the combustion chamber 11.

When the electric superchargers are operated in each driving mode, the controller 90 may calculate a supercharger consumed energy and an additional fuel energy that means a power at step S30. Herein, the supercharger consumed energy may mean an energy that is consumed in the electric supercharger in each driving mode, and the additional fuel energy may mean an energy generated by fuel additionally supplied to the engine comparing to an energy consumed when the engine is operated at the optimal operating line (OOL) in a natural aspiration (NA) mode. The additional fuel energy may be calculated from a fuel additionally supplied. For example, the additional fuel energy may be calculated by multiplying a fuel amount in which is additionally supplied, a chemical energy density of the fuel, an engine efficiency, and a power transmission efficiency.

The controller 90 may calculate a drive motor consumed energy consumed by the drive motor 50 when the engine output increased by the operation of the electric supercharger is assisted through the drive motor 50 without operating the electric supercharger at step S30.

When the electric superchargers are operated in the single mode, the energy consumed by one electric supercharger becomes the supercharger consumed energy. And the energy consumed by the drive motor 50 becomes the drive motor consumed energy when the engine output increased by the operation of the electric supercharger is assisted by the drive motor 50 without operating the electric supercharger.

For example, assume that the required operating point to meet the required torque of the driver is engine speed of 2,000 RPM and engine torque of 140 Nm (see A' in FIG. 9).

At this time, a difference between the torque at the optimal operating point in the NA mode (e.g., engine torque of 80 Nm at engine speed 2,000 RPM) and the torque at the required operating point is caused by the operation of the electric supercharger. Therefore, the engine 10 additionally outputs 60 Nm by the operation of the electric supercharger, and the electric energy consumed by the electric supercharger to output the additional 60 Nm of the engine torque becomes the supercharger consumed energy.

And when drive motor 50 assists 60 Nm which is the difference between the torque at the optimum operating point in the NA mode (e.g., engine torque of 80 Nm at engine speed 2,000 RPM) and the and the torque at the required operating point, the energy consumed by the drive motor 50 becomes the drive motor consumed energy.

When the electric superchargers are operated in the serial mode, the energy consumed by the two electric superchargers becomes the supercharger consumed energy.

For example, assume that the required operating point to meet the required torque of the driver is engine speed of 3,000 RPM and engine torque of 220 Nm (see B' in FIG. 9).

At this time, a difference between the torque at the optimal operating point in the NA mode (e.g., engine torque of 110 Nm at engine speed 3,000 RPM) and the torque at the required operating point is caused by the operation of the electric supercharger. Therefore, the engine 10 additionally outputs 110 Nm by the operation of the electric superchargers in the serial mode, and the electric energy consumed by the electric superchargers to output the additional 110 Nm of the engine torque becomes the supercharger consumed energy.

And when drive motor 50 assists 110 Nm which is the difference between the torque at the optimum operating point in the NA mode (e.g., engine torque of 110 Nm at engine speed 3,000 RPM) and the and the torque at the required operating point, the energy consumed by the drive motor 50 becomes the drive motor consumed energy.

When the electric superchargers are operated in the parallel mode, the energy consumed by the two electric superchargers becomes the supercharger consumed energy.

For example, assume that the required operating point to meet the required torque of the driver is engine speed of 5,500 RPM and engine torque of 170 Nm (see 'C' in FIG. 9).

At this time, a difference between the torque at the optimal operating point in the NA mode (e.g., engine torque of 90 Nm at engine speed 5,500 RPM) and the torque at the required operating point is caused by the operation of the electric superchargers. Therefore, the engine 10 additionally outputs 80 Nm by the operation of the electric superchargers in the parallel mode, and the electric energy consumed by the electric superchargers to output the additional 80 Nm of the engine torque becomes the supercharger consumed energy.

And when drive motor 50 assists 80 Nm which is the difference between the torque at the optimum operating point in the NA mode (e.g., engine torque of 90 Nm at engine speed 5,500 RPM) and the and the torque at the required operating point, the energy consumed by the drive motor 50 becomes the drive motor consumed energy.

The controller 90 may compare a summation of the supercharger consumed energy and the additional fuel energy to the drive motor consumed energy at step S40. When the summation of the supercharger consumed energy and the additional fuel energy is less than the drive motor consumed energy, the controller 90 may operate the electric supercharger according to the driving mode determined at the step S20 to satisfy the required torque of the driver at step S50.

In the step S40, when the summation of the supercharger consumed energy and the additional fuel energy is greater than the drive motor consumed energy, the controller 90 may determine the SOC region of the battery 70 at step S60.

When the SOC region of the battery 70 is a high region or a normal region, the controller 90 may assist the engine output by operating the drive motor 50 to satisfy the required torque of the driver at step S61. In this case, the drive motor 50 may assist the engine output because the battery energy (or, SOC) is available and the energy consumed by the drive motor 50 less than the energy consumed by the electric superchargers.

When the SOC region of the battery is a low region, the controller 90 may operate the electric superchargers according to the driving mode determined at the step S20 to satisfy the required torque of the driver at step S63. In this case, since the SOC is low, the engine output is increased by operating the electric superchargers without operating the drive motor 50.

As described above, according to an exemplary form of the present disclosure, since an operation of the drive motor and the electric superchargers to meet the required torque of the driver is determined by comparing the summation of supercharger consumed energy and the additional fuel energy to the drive motor consumed energy, it is possible to minimize power consumption of the engine and the drive motor.

In addition, since the drive motor 50 and the electric superchargers are controlled by considering the SOC of the battery 70, the system efficiency of the entire vehicle can be improved.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

10: engine
11: combustion chamber
13: intake manifold
14: throttle valve
15: exhaust manifold
17: exhaust line
19: catalytic converter
21: first intake line
22: second intake line
23: connection line
24: main intake line
25: first intake valve
26: second intake valve
27: connection valve
29: air cleaner
31: first electric supercharger
32: second electric supercharger
35: auxiliary intercooler
36: main intercooler
40: HSG
50: drive motor
60: clutch
70: battery
80: transmission
90: controller
100: accelerator pedal sensor

What is claimed is:
1. An apparatus of controlling a hybrid vehicle, the apparatus comprising:

an engine configured to combust fuel to generate an engine power;

a drive motor configured to assist the engine power and selectively operate as a generator to generate electrical energy;

a battery configured to supply electrical energy to the drive motor or to be charged by the electrical energy generated at the drive motor;

a first intake valve disposed in a first intake line through which intake air is supplied to a combustion chamber of the engine;

a second intake valve disposed in a second intake line through which intake air is supplied to the combustion chamber;

a first electric supercharger disposed in the first intake line;

a second electric supercharger disposed in the second intake line;

a connecting valve disposed in a connecting line configured to connect the first intake line and the second intake line; and a controller configured to:
determine a driving mode among a plurality of driving modes of the first and second electric superchargers, and
control the drive motor and the first and second electric superchargers by comparing a summation of a supercharger consumed energy and an additional fuel energy to a drive motor consumed energy, wherein:
the supercharger consumed energy is an energy that is consumed by the first and second electric superchargers in the driving mode,
the additional fuel energy is an energy generated by fuel additionally supplied to the engine comparing to an energy consumed when the engine is operated at an optimal operating line (OOL) in a natural aspiration (NA) mode, and
the drive motor consumed energy is an energy consumed by the drive motor when the engine power is assisted by the drive motor.

2. The apparatus of claim 1, wherein the plurality of driving modes includes a single mode, a serial mode, and a parallel mode, and wherein:
in the single mode, intake air compressed by one of the first and second electric superchargers is supplied to the combustion chamber,
in the serial mode, intake air compressed in series by the first electric supercharger and the second electric supercharger is supplied to the combustion chamber, and
in the parallel mode, intake air compressed by the first electric supercharger and intake air compressed by the second electric supercharger are supplied in parallel to the combustion chamber.

3. The apparatus of claim 1, wherein the controller is configured to determine whether to operate the drive motor and the first and second electric superchargers based on a state of charger (SOC) of the battery when the summation of the supercharger consumed energy and the additional fuel energy is greater than the drive motor consumed energy.

4. The apparatus of claim 3, wherein the controller is configured to operate the drive motor to assist the engine power when the SOC of the battery is in a high region or a normal region.

5. The apparatus of claim 3, wherein the controller is configured to operate the first and second electric superchargers to increase the engine power when the SOC of the battery is in a low region.

6. The apparatus of claim 1, wherein the controller is configured to operate the first and second electric superchargers based on the determined driving mode such that the engine power is increased when the summation of the supercharger consumed energy and the additional fuel energy is less than the drive motor consumed energy.

7. A method of controlling a hybrid vehicle, the method comprising:
determining, by a controller, a driving mode among a plurality of driving modes of a first electric supercharger and a second electric supercharger based on a required torque from a driver;
calculating, by the controller, a supercharger consumed energy and an additional fuel energy, wherein the supercharger consumed energy is an energy that is consumed by the first and second electric superchargers in the driving mode, and the additional fuel energy is an energy generated by fuel additionally supplied to an engine comparing to an energy consumed when the engine is operated at an optimal operating line (OOL) in a natural aspiration (NA) mode;
calculating, by the controller, a drive motor consumed energy, wherein the drive motor consumed energy is an energy consumed by a drive motor when an engine power generated by the engine is assisted by the drive motor without operating the first and second electric superchargers; and
controlling, by the controller, the drive motor and the first and second electric superchargers by comparing a summation of the supercharger consumed energy and the additional fuel energy to the drive motor consumed energy.

8. The method of claim 7, wherein the plurality of driving modes of the first and second electric superchargers includes a single mode, a serial mode, and a parallel mode, and wherein:
in the single mode, intake air compressed by one of the first and second electric superchargers is supplied to a combustion chamber of the engine,
in the serial mode, intake air is doubly compressed by the first electric supercharger and the second electric supercharger and supplied to the combustion chamber, and
in the parallel mode, intake air compressed by the first electric supercharger and intake air compressed by the second electric supercharger, are supplied in parallel to the combustion chamber.

9. The method of claim 7, further comprising:
determining, by the controller, whether to operate the drive motor and the first and second electric superchargers based on a state of charger (SOC) of a battery when the summation of the supercharger consumed energy and the additional fuel energy is greater than the drive motor consumed energy.

10. The method of claim 9, wherein when the SOC of the battery is in a high region or a normal region, the drive motor is operated to assist the engine power.

11. The method of claim 9, wherein when the SOC of the battery is in a low region, the first and second electric superchargers are operated to increase the engine power.

12. The method of claim 7, wherein when the summation of the supercharger consumed energy and the additional fuel energy is less than the drive motor consumed energy, the first and second electric superchargers are operated based on the determined driving mode such that the engine power is increase.

* * * * *